(12) United States Patent
Stachniak et al.

(10) Patent No.: US 9,051,045 B2
(45) Date of Patent: Jun. 9, 2015

(54) INDIRECT DRIVE ACTIVE CONTROL COLUMN

(75) Inventors: Darryl S. Stachniak, Chicago, IL (US); Thomas M. Rusak, Skokie, IL (US); Brian P. Dyra, Elmhurst, IL (US)

(73) Assignee: Woodward MPC, Inc., Skokie, IL (US)

( * ) Notice: Subject to any disclaimer, the term of this patent is extended or adjusted under 35 U.S.C. 154(b) by 821 days.

(21) Appl. No.: 12/845,160

(22) Filed: Jul. 28, 2010

(65) Prior Publication Data
US 2012/0025030 A1 Feb. 2, 2012

(51) Int. Cl.
*B64C 13/12* (2006.01)
*B64C 13/50* (2006.01)
*B64C 13/04* (2006.01)
*G05G 5/03* (2008.04)
*G05G 11/00* (2006.01)

(52) U.S. Cl.
CPC .............. *B64C 13/503* (2013.01); *B64C 13/04* (2013.01); *B64C 13/12* (2013.01); *G05G 5/03* (2013.01); *G05G 11/00* (2013.01)

(58) Field of Classification Search
USPC ........................... 244/223, 224, 229, 234, 236
See application file for complete search history.

(56) References Cited

U.S. PATENT DOCUMENTS

| | | | | |
|---|---|---|---|---|
| 2,955,356 A * | 10/1960 | Wheeler et al. | | 235/401 |
| 3,415,469 A * | 12/1968 | Spratt | | 244/48 |
| 3,902,379 A | 9/1975 | Bennett et al. | | |
| 4,473,203 A | 9/1984 | Barnoin et al. | | |
| 4,688,443 A | 8/1987 | Fabre et al. | | |
| 4,716,399 A | 12/1987 | Nordlund | | |
| 4,717,098 A * | 1/1988 | Walker et al. | | 244/223 |
| 5,149,023 A | 9/1992 | Sakurai et al. | | |
| 5,456,428 A | 10/1995 | Hegg | | |
| 5,489,830 A * | 2/1996 | Fernandez | | 318/628 |
| 5,900,710 A | 5/1999 | Gautier et al. | | |
| 6,128,554 A * | 10/2000 | Damotte | | 701/4 |
| 6,572,055 B1 | 6/2003 | Bernard | | |
| 6,659,218 B2 * | 12/2003 | Thomas et al. | | 180/402 |
| 7,648,106 B2 * | 1/2010 | Granier et al. | | 244/223 |
| 2002/0003082 A1 * | 1/2002 | Janniere et al. | | 200/6 A |
| 2002/0135327 A1 | 9/2002 | Szulyk et al. | | |
| 2003/0183440 A1 | 10/2003 | Thomas et al. | | |
| 2004/0160415 A1 * | 8/2004 | Rosenberg et al. | | 345/156 |
| 2007/0139375 A1 * | 6/2007 | Rosenberg et al. | | 345/161 |
| 2008/0142642 A1 * | 6/2008 | Marino et al. | | 244/223 |

(Continued)

FOREIGN PATENT DOCUMENTS

CN 101370701 A 2/2009
EP 1 918 196 A1 5/2008
(Continued)

OTHER PUBLICATIONS

U.S. Appl. No. 12/844,867, filed Jul. 28, 2010, Szulyk et al.
(Continued)

*Primary Examiner* — Valentina Xavier
(74) *Attorney, Agent, or Firm* — Reinhart Boerner Van Deuren P.C.

(57) ABSTRACT

An indirect drive active control column for an aircraft control system is provided. The indirect drive active control column provides both active and passive feedback to the control stick. The passive feedback relates to adjustments of the control stick relative to a feedback neutral position. The active feedback actively adjusts the position of the feedback neutral position to adjust a feedback profile of the passive feedback.

18 Claims, 1 Drawing Sheet

(56) References Cited

U.S. PATENT DOCUMENTS

2009/0125166 A1 5/2009 Johnson et al.
2009/0234518 A1 9/2009 Irwin, III et al.
2009/0314901 A1 12/2009 Granier et al.

FOREIGN PATENT DOCUMENTS

| FR | 2 558 136 A1 | 7/1985 |
|---|---|---|
| GB | 126568 | 5/1919 |
| GB | 827089 | 2/1960 |
| GB | 925471 | 5/1963 |
| GB | 2465761 A | 6/2010 |
| GB | 2482407 A | 2/2012 |
| JP | 2008204098 A | 2/2007 |
| WO | 2006/018027 A2 | 2/2006 |

OTHER PUBLICATIONS

U.S. Appl. No. 12/845,246, filed Jul. 28, 2010, Stachniak et al.
U.S. Appl. No. 12/910,193, filed Oct. 22, 2010, Burroughs et al.
U.S. Appl. No. 12/976,723, filed Dec. 22, 2010, Scott et al.

* cited by examiner

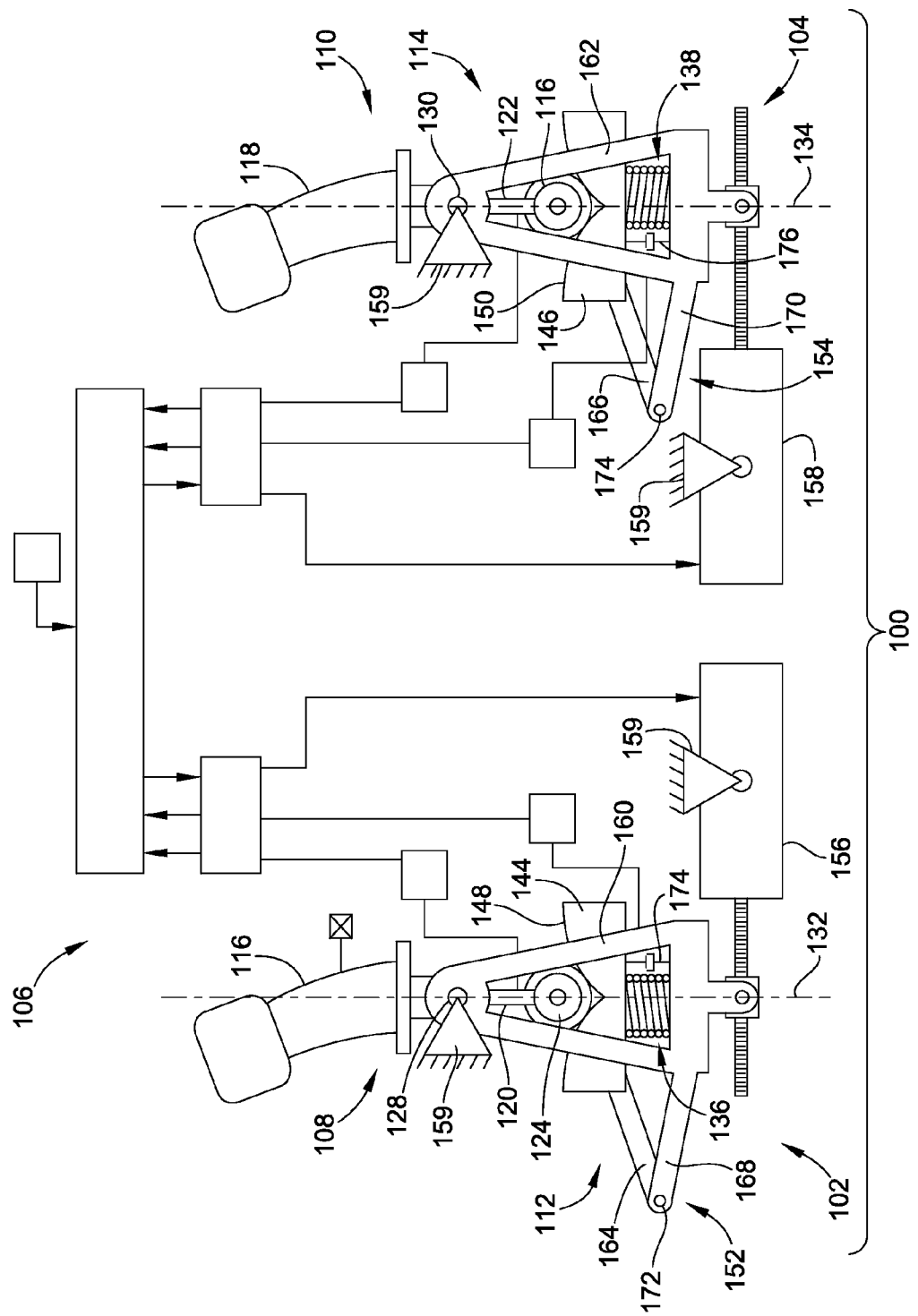

INDIRECT DRIVE ACTIVE CONTROL COLUMN

FIELD OF THE INVENTION

This invention generally relates to control columns for aircrafts and more particularly fly-by-wire control columns for aircrafts.

BACKGROUND OF THE INVENTION

As the performance requirements of both civil and military aircraft increases, conventional control technologies using mechanical linkages cannot relieve the pilot from higher mental and manual control activity. As such, today's high performance aircraft as well as some transport aircraft use "fly-by-wire" sidesticks and center sticks also referred to as "control columns".

These fly-by-wire control columns simulate tactile feedback relating to the control surfaces of the aircraft to the control columns.

In a "passive" control column, the pilot feels spring or damper forces according to the applied deflection of a stick of the control column which is the control input to a flight control computer (FCC). These forces are realized by a spring and damper package. In such a passive control column, the pilot's controller forces (i.e. tactile feel) are usually fixed.

A drawback of this passive control concept, as opposed to conventional controllers, is that the pilot loses the contact with the control surfaces of the aircraft and loses contact with the second pilot in the cockpit. As such, the pilot loses tactile information and can only use visual cues to inform him about the actual flight state and available trim control power as well as what the other pilot is doing. Further drawbacks relate to the fact that the feedback profile cannot be adjusted to compensate for other changes in the flight state of the aircraft or control surfaces such as due to changes in, for example, altitude, weather, or mechanical failures.

In a "direct drive active" control column, the pilot experiences a simulated control force through the use of elaborate servo systems alone. In the direct drive active control system, a motor, drive electronics, and a high bandwidth closed loop force and damping control algorithm are used to provide the tactile feedback directly to the stick simulating the tactile feedback of the control surfaces of aircraft. By using this high bandwidth system, the system is expensive and bulky due to the increased number of sensors, and the complexity of the control system. Further, it is contemplated that in these direct drive active systems, that if the motor fails, the stick can become locked thereby preventing the pilot from controlling the aircraft. To correct for this, unnecessary redundancy must be built into the system.

It is desired to provide an adjustable tactile feedback system for a control column that does not have the downfalls of standard "fully active" control columns and that can be adjusted to provide tactile feedback to one control column relating to the activities of the pilot of the other control column.

BRIEF SUMMARY OF THE INVENTION

Embodiments of the present invention provide new and improved control systems for an aircraft that include both active and passive feedback to control columns of the control system. The use of both active and passive feedback provides the benefits of both systems such as mechanically simple device that is cheap to manufacture and that does not require high-bandwidth drive electronics and algorithms.

In one particular embodiment, an indirect drive active control column comprising a stick, a passive feedback arrangement and an actuator is provided. The stick is moveable relative to a mechanical ground by a pilot to input control signals to the aircraft. This stick may control one or both attitudes of pitch and roll. The passive feedback arrangement is movable relative to the mechanical ground and directly acts on the stick to provide a passive feedback force profile to the stick when the stick is moved relative to the passive feedback arrangement. The actuator is operably coupled to the passive feedback arrangement for actively adjusting the position of the passive feedback arrangement relative to the mechanical ground. Adjustment of the passive feedback arrangement relative to mechanical ground can adjust the force profile of the feedback arrangement relative to mechanical ground.

In one embodiment, the passive feedback assembly includes a cam including a cam surface and a resistance arrangement. The cam surface defines a feedback neutral position. The stick includes a cam follower that follows the cam surface. The resistance arrangement increasingly biases the cam surface to resists movement of the cam follower from the feedback neutral position to provide the passive tactile feedback.

The resistance arrangement, in more particular embodiments, may be provided by a spring and/or damper arrangement. The damper arrangement might be a rotary fluidic damper.

In one embodiment, the cam surface is generally V-shaped with the cam follower positioned within the V-shape of the cam surface. The feedback neutral position is when the cam follower contacts both sides of the V-shaped surface or otherwise centered within the V-shape.

In one embodiment, the passive feedback assembly includes a gimbal arrangement that carries the cam surface and the resistance arrangement. The actuator is operably coupled to the gimbal arrangement and configured to adjust the position of the gimbal arrangement relative to mechanical ground to actively adjust the position of the passive feedback assembly relative to mechanical ground. The adjustment also facilitates modification of the feedback profile related to mechanical ground.

The gimbal arrangement and the stick may be pivotally affixed to the mechanical ground for pivotal movement about a common first axis. Additionally, the actuator may be a linear actuator pivotally coupled to the gimbal arrangement for relative pivotal movement therebetween about a second axis and the actuator may be pivotally coupled to the mechanical ground for movement about a third axis offset from the first and second axes.

In one embodiment, the passive feedback arrangement is operably coupled between the stick and the actuator such that any failure of the actuator does not completely prevent movement of the stick relative to the mechanical ground and the feedback assembly. As the control of the aircraft is proportional to the movement of the stick relative to the mechanical ground, if the stick is not prevented from moving relative to mechanical ground upon failure of the actuator, the control column is still able to be used to control the aircraft.

In another embodiment, the passive feedback assembly includes at least one biasing member, the biasing member is interposed between the actuator and the stick rather than between the mechanical ground and the stick at the connection between the stick and the mechanical ground. In such an arrangement, absent an external load being applied to the stick, the biasing member does not oppose actively adjusting the position of the passive feedback arrangement relative to mechanical ground by the actuator. Thus, as the actuator adjusts the position of the passive feedback arrangement relative to mechanical ground, the biasing member is not manipulated when a pilot is not acting on the stick.

In one embodiment, the gimbal arrangement and cam having the cam surface are pivotally coupled to one another.

In one embodiment, the stick is movable relative to the mechanical ground in at least two dimensions, one dimension representing pitch and another dimension representing roll.

A further aircraft control system may be provided by a stick movably coupled to a mechanical ground and a feedback arrangement providing a passive feedback profile for the stick relative to the mechanical ground. At least a portion of the feedback arrangement is movable relative to the mechanical ground and the first stick for adjusting the first feedback profile relative to the mechanical ground.

In one embodiment, the air craft control system further includes an actuator coupled to the passive feedback arrangement for adjusting the position of the passive feedback arrangement relative to the mechanical ground for adjusting the feedback profile.

In one embodiment, the feedback arrangement includes a dampening member. The dampening member does not work against the actuator when the actuator adjusts the position of the passive feedback arrangement relative to the mechanical ground.

A method of providing feedback to a control stick of an aircraft control system is also provided. The method includes the steps of passively biasing the control stick when the control stick is transitioned from a feedback neutral position and actively adjusting the feedback neutral position relative to a mechanical ground so as to adjust a passive feedback profile relative to the mechanical ground.

The step of passively biasing the control stick may be performed by a passive feedback arrangement. The step of passively biasing the control stick may include dampening biasing of the stick as the stick is transitioned from the feedback neutral position relative to the passive feedback arrangement. In a more particular embodiment, dampening is independent of the relative movement between the mechanical ground and the control stick.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

The included FIGURE is a schematic illustration of an aircraft control system including control columns according to an embodiment of the present invention.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

The included FIGURE is a simplified schematic illustration of an aircraft control system 100 for controlling pitch, roll or both pitch and roll of an aircraft. The aircraft control system 100 generally includes first and second control columns 102, 104 (referred to generically as "control columns 102, 104"). The control columns 102, 104 are used by the pilots (e.g. pilot and co-pilot) to control various operation of the aircraft such as pitch, roll and/or pitch and roll.

The control columns 102, 104 are considered fly-by-wire control columns because the manipulation of the control columns to adjust the pitch and/or roll of the aircraft is not translated directly to the control surfaces of the aircraft by mechanical devices. Instead, the deviations of the control columns from neutral positions are sensed and then converted into electrical signals. These signals are then sent to actuators which use the electrical signals to make proportional changes in the control surfaces of the aircraft.

Because the control columns 102, 104 are not mechanically linked to the control surfaces, the control system 100 incorporates tactile feedback that is applied to the control columns 102, 104 to simulate the feeling that a pilot would get if the control columns 102, 104 were in fact mechanically coupled to the control surfaces. For instance, if the pilots request a large degree of pitch or roll, the tactile feedback would increase the amount of force the pilots would have to apply to the control columns to implement that change in the control surfaces. As such, a large degree of deviation in the current control of the aircraft would be executed by applying a large force to the corresponding control column by the pilots.

The control columns 102, 104 generally include first and second sticks 108, 110 (i.e. pilot and copilot sticks) with which the pilots input control signals relating to desired pitch and/or roll. The first and second sticks 108, 110 interact with first and second feedback assemblies 112, 114 to provide tactile feedback. The columns 102, 104 are coupled to an electronic control arrangement 106 that controls the dynamic adjustments of the feedback assemblies 112, 114.

Each feedback assembly 112, 114 provides the tactile feedback to its corresponding stick 108, 110. In some embodiments, this tactile feedback has two components, a passive component and an active component.

Typically, the passive component, i.e. a first portion of the tactile feedback, relates to the flight state, i.e. the amount of pitch or roll the pilot is requesting due to the amount of stick deflection from a neutral position. In one embodiment, the active component, i.e. the second portion of the tactile feedback, relates to conflicts between the two different control columns 102, 104. More particularly, the feedback assemblies 112, 114 provide tactile feedback when the two sticks 108, 110 are not at the same position relative to a mechanical ground, i.e. the pilots are providing conflicting control commands to the aircraft. However, other systems could provide active tactile feedback based on other inputs such as changes in characteristics of the aircraft such as changes in altitude, icing of the control surfaces, failure or reduced functionality of the actuators controlling the control surfaces, etc.

The control columns 102, 104 of this embodiment are substantially identical. Stick 108 generally includes a first grip portion 116 and stick 110 includes a second grip portion 118. The pilots manually manipulate the grip portions 116, 118 to control the desired amount of pitch and/or roll. Grip portion 116 is operably coupled to a first connecting rod 120 and grip portion 118 is operably coupled to second connecting rod 122. The connecting rods 120, 122 are operably coupled to or include one of first and second cam followers 124, 126, respectively (illustrated as rollers in the present embodiment). The cam followers 124, 126 interact with the corresponding feedback assembly 112, 114 to provide a variable tactile feedback profile to the sticks 108, 110.

The sticks 108, 110 pivot about a corresponding one of a first or a second common pivot point 128, 130 relative to a corresponding one of a first and a second ground neutral position 132, 134. The angular displacement of the sticks 108, 110 relative to the corresponding ground neutral position 132, 134 is proportional to the amount of pitch or roll that the pilot is requesting, i.e. proportional to the amount of change in the position of the corresponding control surfaces of the aircraft.

In general, the feedback assemblies 112, 114 provide tactile feedback to the pilot by providing resistance to the movement of the sticks 108, 110 from the ground neutral position 132, 134. In one embodiment, the feedback assemblies 112, 114 are indirect drive active feedback assemblies. This allows the system to provide both the active and passive feedback. The feedback assemblies 112, 114 utilize passive feedback as the first form of tactile feedback, which, as mentioned above, typically, relates to the control state of the sticks 108, 110. This relates to the amount of pitch and/or roll requested and simulates attachment to the control surfaces of the aircraft. This passive feedback is provided by resistance arrangements 136, 138 (i.e. a spring and damper package) that opposes the rotational movement of stick 108, 110 from a feedback neutral position by using one or more springs and/or dampers or other biasing devices.

In typical embodiments, the resistance profile of the resistance arrangement increases the greater the amount of angular displacement or deflection of the sticks 108, 110 from the feedback neutral position, which happens to be neutral position 132, 134 in the illustrated embodiment. This resistance provides feedback to the pilot such that when the pilot requests a certain amount of pitch or roll, the pilots muscle memory will tend to apply a certain amount of pushing or pulling force to overcome the force of the springs and dampers of the resistance arrangements 136, 138. Thus, the pilots will "learn" how much force is needed for control of the aircraft, i.e. how much force is used to adjust the position of the sticks 108, 110 relative to ground neutral 132, 134 for a given amount of pitch and/or roll.

The feedback assemblies 112, 114, in the illustrated embodiment, include a profiled first or second cam 144, 146 that has first and second V-shaped cam surfaces 148, 150, respectively, with which the cam followers 124, 126 interact. As the cam followers 124, 126 transition away from the center, i.e. bottom of the "V", of the cam surfaces 148, 150, the resistance arrangements 136, 138 increase the angular force applied to the corresponding stick 108, 110 to provide tactile feedback to the pilot.

The center point of cam surfaces 148, 150 can also be referred to as a "feedback neutral position" or a "gimbal neutral position", because in this position, no rotational force is being applied to the sticks 108, 110 by the feedback assemblies 112, 114. In one embodiment, in the feedback neutral position (as shown in the FIGURE), the cam followers 124, 126 will contact both sides of the corresponding V-shaped cam surface 148, 150, such that no rotational force is applied to the sticks 108, 110 by the feedback assemblies 112, 114. In FIG. 1, the feedback neutral position is illustrated as being aligned with the ground neutral positions 132, 134.

The first and second cams 144, 146 in combination with the first and second resistance arrangements 136, 138 can be referred to as passive centering mechanisms as the forces generated thereby attempt to always drive the sticks 108, 110 toward the center of the cams 144, 146, which correspond to the feedback neutral positions.

In some embodiments, the aircraft control system 100 is also configured to provide active tactile feedback to the pilots when there is a discrepancy of the control input between the two different sticks 108, 110. A discrepancy occurs when one pilot is trying to request a different degree of pitch and/or roll than the other pilot. This can be represented using the second form of tactile feedback identified above, the active tactile feedback.

In one embodiment, the feedback assemblies 112, 114 are configured to attempt to maintain the first and second sticks 108, 110 in a same position relative to mechanical ground 159 when one pilot's actions cause a discrepancy in position between the two sticks 108, 110.

To provide active tactile feedback to one stick 108, 110 relating to the operation of the other stick 110, 108, the feedback assemblies 112, 114 include one of movable first and second gimbals 152, 154 that are driven by a corresponding one of first and second actuators 156, 158 to adjust the position of first and second cams 144, 146 relative to the mechanical ground 159. The adjustment of the position of the cams 144, 146 relative to mechanical ground 159 actively adjusts the force feedback profile relative to mechanical ground 159. Thus, different force can be applied to the corresponding sticks 108, 110 by the corresponding feedback assembly 108, 110 when the sticks 108 110 are moved relative to mechanical ground.

In the illustrated embodiment, actuators 156, 158 are illustrated as linear actuators pivotally coupled to the mechanical ground 159 and pivotally coupled to gimbals 152, 154. However, other actuators could be used such as rotary actuators positioned, for example, at pivot points 128, 130 or motors having gears that act on corresponding gearing of gimbals 152, 154. Other types of drive mechanisms could be used for adjusting the position of the gimbals 152, 154 relative to mechanical ground 159.

Further, because the passive feedback portion, i.e. the resistance arrangements 136, 138, corresponding gimbals 152, 154, cams 144, 146 are interposed between the actuators 156, 158 and sticks 108, 110, this provides an indirect drive because the actuators 156, 158 are not directly coupled to the sticks 108, 110. Thus, the sticks 108, 110 may move, to at least some degree, independent of the actuators 156, 158. Thus, there is at least a limited or biased degree of freedom between the sticks 108, 110 and their corresponding feedback assemblies 112, 114. As such, if the actuators 156, 158 were to lock up or to be controlled to a fixed state, the sticks 108, 110 are still be able to move relative to mechanical ground 159 allowing the pilots to still make adjustments in the control state of the aircraft.

Gimbals 152, 154 are rotationally mounted to the mechanical ground 159 for rotation about first and second common pivot points 128, 130, respectively. As such, the stick 108, 110 and the gimbal 152, 154 of a given control column 102, 104 are permitted to rotate about a corresponding common axis provided by the respective common pivot point 128, 130.

In the illustrated embodiment, the gimbals 152, 154 include gimbal frames 160, 162. The first and second cams 144, 146 are movably carried by gimbal frames 160, 162. In the illustrated embodiment, the first and second cams 144, 146 include cam connecting arms 164, 166 that pivotally connect to first and second gimbal frame arms 168, 170. The first and second cams 144, 146 and first and second gimbal frames 160, 162 rotate relative to one another through the pivotal connections 172, 174 therebetween to adjust the amount of force being applied to the first and second sticks 108, 110 due to adjustments in the compression or expansion of the biasing mechanisms within resistance arrangements 136, 138.

However, other means for allowing the cams 144, 146 to move relative to gimbal frames 160, 162 could be provided. For instance, the cams 144, 146 could be free floating and merely attached to the end of the resistance arrangements 136, 138. Alternatively, the cams 144, 146 could be mounted for linear sliding along the gimbal frames 160, 162.

The resistance arrangements 136, 138 provide dampers 174, 176 that add damping to the system. In the illustrated embodiment, the resistance arrangements 136, 138 and particularly the dampers thereof are interposed between the sticks 108, 110 and the gimbals 152, 154. While other embodiments could interpose portions of the resistance arrangements 136, 138, and particularly the dampers 174, 176, between the mechanical ground 159 and the sticks 108, 110, this embodiment does not do so as it provides the added benefit of isolating the effect of the dampers 174, 176 from actuators 156, 158. As such, in this embodiment, the resistance arrangements 136, 138 and particularly the dampers 174, 176 thereof do not work against actuators 156, 158 as the actuators 156, 158 adjust the position of the gimbals 152, 154 relative to mechanical ground 159.

By placing the resistance arrangement between the sticks 108, 110 and the gimbals 152, 154, the actuators 156, 158 drive the sticks 108, 110 through the passive feedback portions of the feedback assemblies 112, 114, but, absent pilot input, the resistance arrangements 136, 138 and particularly dampers 174, 176 thereof do not oppose the motion of the actuators 156, 158.

The dampers 174, 176 could be rotary fluidic damping modules. Alternatively, they could be linear style fluid dampers. Other dampers, such as electronic dampers could also be incorporated.

More particular control of the positioning of the cams 144, 146 relative to mechanical ground is described in co-pending application assigned to the assignee of the instant application, entitled Position Control System for Cross Coupled Operation of Fly-By-Wire Control Columns, application Ser. No. 12/844,867 filed on Jul. 28, 2010, the teachings and disclosure of which are incorporated herein by reference thereto.

In one embodiment, by actively adjusting the position of the gimbals 152, 154, and consequently the corresponding cams 144, 146 thereof about the common pivot points 128, 130, the resistance or feedback profile relative to neutral positions 132, 134 and mechanical ground 159 applied to the corresponding sticks 108, 110 is actively altered providing modified tactile feedback to the pilot.

This active adjustability can be used to indicate a discrepancy between the commands provided by the two sticks 108, 110. This adjustability in the force profile can also be used to attempt to maintain the two sticks 108, 110 in a common location when one pilot inputs such a control discrepancy by providing a corrective force to the moved stick that compensates for the increased force applied by the pilot trying to deviate from the other stick. Further, this active adjustability in the resistance or feedback profile can also be used to simulate other changes in the aircraft such as changes in the control surfaces, changes or failures in the actuators that control the control surfaces, icing of the control surfaces, changes in altitude, etc.

Additional features of the system 100 are disclosed in co-pending application assigned to the assignee of the instant application, entitled Active Control Column with Manually Activated Reversion to Passive Control Column, application Ser. No. 12/845,246 filed on Jul. 28, 2010, the teachings and disclosure of which are incorporated herein by reference thereto.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An indirect drive active control column comprising:
   a stick moveable relative to a mechanical ground;
   a passive feedback arrangement movable relative to the mechanical ground, the passive feedback arrangement directly acting on the stick providing a passive feedback force profile to the stick when the stick is moved relative to the passive feedback arrangement;
   an actuator coupled to the passive feedback arrangement for actively adjusting the position of the passive feedback arrangement relative to the mechanical ground; and
   wherein the passive feedback assembly includes a cam including a cam surface and a resistance arrangement, the cam surface defining a feedback neutral position, the stick includes a cam follower following the cam surface, wherein the resistance arrangement increasingly biases the cam surface to resists movement of the cam follower from the feedback neutral position to provide the passive tactile feedback.

2. The indirect drive active control column of claim 1, wherein the resistance arrangement is provided by a spring and damper arrangement.

3. The indirect drive active control column of claim 2, wherein the cam surface is generally V-shaped with the cam follower positioned within the V-shape of the first cam surface, wherein the feedback neutral position is when the cam follower contacts both sides of the V-shaped surface.

4. The indirect drive active control column of claim 1, wherein the passive feedback assembly includes a gimbal arrangement that carries the cam surface and the resistance arrangement, the actuator coupled to the gimbal arrangement and configured to adjust the position of the gimbal arrangement relative to mechanical ground to adjust the position of the passive feedback assembly relative to mechanical ground.

5. The indirect drive active control column of claim 4, wherein the gimbal arrangement and the stick are pivotally affixed to the mechanical ground for pivotal movement about a common first axis.

6. The indirect drive active control column of claim 5, wherein the first actuator is a linear actuator pivotally coupled to the gimbal arrangement for relative pivotal movement therebetween about a second axis and the actuator is pivotally coupled to the mechanical ground for movement about a third axis offset from the first and second axes.

7. An indirect drive active control column comprising:
a stick moveable relative to a mechanical ground;
a passive feedback arrangement movable relative to the mechanical ground, the passive feedback arrangement directly acting on the stick providing a passive feedback force profile to the stick when the stick is moved relative to the passive feedback arrangement;
an actuator coupled to the passive feedback arrangement for actively adjusting the position of the passive feedback arrangement relative to the mechanical ground; and
wherein the passive feedback arrangement is operably coupled between the stick and the actuator such that any failure of the actuator does not completely prevent movement of the stick relative to the mechanical ground and the feedback assembly.

8. An indirect drive active control column comprising:
a stick moveable relative to a mechanical ground;
a passive feedback arrangement movable relative to the mechanical ground, the passive feedback arrangement directly acting on the stick providing a passive feedback force profile to the stick when the stick is moved relative to the passive feedback arrangement;
an actuator coupled to the passive feedback arrangement for actively adjusting the position of the passive feedback arrangement relative to the mechanical ground;
wherein the passive feedback assembly includes at least one biasing member, the biasing member is interposed between the actuator and the stick.

9. The indirect drive active control column of claim 8, wherein, absent an external load being applied to the stick, the biasing member does not oppose actively adjusting the position of the passive feedback arrangement relative to mechanical ground by the actuator.

10. The indirect drive active control column of claim 9, wherein the biasing member is a fluidic damper.

11. An indirect drive active control column comprising:
a stick moveable relative to a mechanical ground;
a passive feedback arrangement movable relative to the mechanical ground, the passive feedback arrangement directly acting on the stick providing a passive feedback force profile to the stick when the stick is moved relative to the passive feedback arrangement;
an actuator coupled to the passive feedback arrangement for actively adjusting the position of the passive feedback arrangement relative to the mechanical ground;
wherein the passive feedback assembly includes a cam including a cam surface and a resistance arrangement, the cam surface defining a feedback neutral position, the stick includes a cam follower following the cam surface, wherein the resistance arrangement increasingly biases the cam surface to resists movement of the cam follower from the feedback neutral position to provide the passive tactile feedback;
wherein the passive feedback assembly includes a gimbal arrangement that carries the cam surface and the resistance arrangement, the actuator coupled to the gimbal arrangement and configured to adjust the position of the gimbal arrangement relative to mechanical ground to adjust the position of the passive feedback assembly relative to mechanical ground; and
wherein the gimbal arrangement and cam having the cam surface are pivotally coupled to one another.

12. The indirect drive active control column of claim 11, wherein the resistance arrangement is laterally offset from the pivotal coupling between the gimbal arrangement and the cam.

13. The indirect drive active control column of claim 7, wherein the stick is movable relative to the mechanical ground in at least two dimensions, one dimension representing pitch and another dimension representing roll.

14. An aircraft control system comprising:
a stick movably coupled to a mechanical ground, and
a feedback arrangement providing a passive feedback profile for the stick relative to the mechanical ground, at least a portion of the feedback arrangement being movable relative to the mechanical ground and the stick for adjusting the feedback profile relative to the mechanical ground;
an actuator coupled to the passive feedback arrangement for adjusting the position of the passive feedback arrangement relative to the mechanical ground for adjusting the feedback profile; and
the passive feedback arrangement is operably coupled between the stick and the actuator such that any failure of the actuator does not completely prevent movement of the stick relative to the mechanical ground and the feedback assembly.

15. The aircraft control system of claim 14, wherein the feedback arrangement includes a dampening member, the dampening member not working against the actuator when the actuator adjusts the position of the passive feedback arrangement relative to the mechanical ground.

16. A method of providing feedback to a control stick of an aircraft control system comprising the steps of:
passively biasing the control stick when the control stick is transitioned from a feedback neutral position with a passive feedback arrangement movable relative to a mechanical ground, the passive feedback arrangement directly acting on the control stick providing a passive feedback force profile to the control stick when the control stick is moved, relative to the passive feedback arrangement; and
actively adjusting the feedback neutral position relative to a mechanical ground so as to adjust a passive feedback profile relative to the mechanical ground with an actuator coupled to the passive feedback arrangement for actively adjusting the position of the passive feedback arrangement relative to the mechanical ground, the passive feedback arrangement being operably coupled between the control stick and the actuator.

17. The method of claim 16, wherein the step of passively biasing the control stick is performed by a passive feedback arrangement and wherein the step of passively biasing the control stick includes dampening biasing of the stick as the stick is transitioned from the feedback neutral position relative to the passive feedback arrangement.

18. The method of claim 17, wherein dampening is independent of relative movement between the mechanical ground and the control stick.

* * * * *